United States Patent
Mizikovsky et al.

(10) Patent No.: US 9,585,013 B2
(45) Date of Patent: Feb. 28, 2017

(54) GENERATION OF MULTIPLE SHARED KEYS BY USER EQUIPMENT AND BASE STATION USING KEY EXPANSION MULTIPLIER

(71) Applicant: Alcatel-Lucent USA Inc., Murray Hill, NJ (US)

(72) Inventors: Semyon Mizikovsky, Morganville, NJ (US); Suresh P. Nair, Whippany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 162 days.

(21) Appl. No.: 14/527,231

(22) Filed: Oct. 29, 2014

(65) Prior Publication Data

US 2016/0127893 A1     May 5, 2016

(51) Int. Cl.
H04M 1/68      (2006.01)
H04W 12/04   (2009.01)
(Continued)

(52) U.S. Cl.
CPC ............ *H04W 12/04* (2013.01); *H04L 63/062* (2013.01); *H04W 72/042* (2013.01)

(58) Field of Classification Search
CPC ...... H04L 9/065; H04L 9/0838; H04L 9/0861; H04L 9/0866; H04L 9/16; H04L 9/18
(Continued)

(56) References Cited

U.S. PATENT DOCUMENTS 8,774,411 B2   7/2014  Cakulev et al.
8,826,376 B2   9/2014  Cakulev et al.
(Continued)

FOREIGN PATENT DOCUMENTS

EP   1973265 A1   9/2008
WO  2009102247 A1   8/2009
(Continued)

OTHER PUBLICATIONS

3GPP, "3rd Generation Partnership Project; Technical Specification Group Services and System Aspects; 3GPP System Architecture Evolution (SAE); Security Architecture (Release 12)," 3GPP Specification No. TS 33.401, Version 12.12.0, Sep. 2014, 129 pages.
(Continued)

*Primary Examiner* — Charles Appiah
*Assistant Examiner* — Edward Zhang
(74) *Attorney, Agent, or Firm* — Ryan, Mason & Lewis, LLP (57) ABSTRACT

In one embodiment, multiple keys are generated in user equipment of a communication system based at least in part on a designated key expansion multiplier. A key identifier is received in the user equipment from a base station of the communication system. The user equipment selects a particular one of the keys as a function of the received key identifier, and utilizes the selected one of the keys to secure data sent from the user equipment to the base station. For example, the keys may comprise respective portions of a key stream generated by the user equipment responsive to a message received from the base station, with the keys being shared by the user equipment and the base station through independent generation of the key stream in the base station. The base station may illustratively comprise an evolved Node B (eNB) of an Evolved Universal Terrestrial Radio Access Network (E-UTRAN).

26 Claims, 5 Drawing Sheets

(51) Int. Cl.
*H04W 72/04* (2009.01)
*H04L 29/06* (2006.01)

(58) Field of Classification Search
USPC ........................................................ 455/410
See application file for complete search history.

(56) References Cited

U.S. PATENT DOCUMENTS

| | | |
|---|---|---|
| 2003/0021417 A1 | 1/2003 | Vasic et al. |
| 2008/0039096 A1 | 2/2008 | Forsberg |
| 2008/0069050 A1 | 3/2008 | Dutta et al. |
| 2008/0070577 A1 | 3/2008 | Narayanan et al. |
| 2008/0267407 A1 | 10/2008 | Vanderveen |
| 2009/0307496 A1 | 12/2009 | Hahn et al. |
| 2010/0098247 A1* | 4/2010 | Suumaki ............... H04L 9/0866 380/44 |
| 2010/0153727 A1 | 6/2010 | Reznik et al. |
| 2010/0205442 A1* | 8/2010 | Han ..................... H04L 9/0844 713/171 |
| 2011/0142239 A1* | 6/2011 | Suh ...................... H04W 12/02 380/270 |
| 2011/0261961 A1 | 10/2011 | Dharmaraju et al. |
| 2012/0008776 A1* | 1/2012 | Ishida ................... H04W 12/04 380/247 |
| 2014/0233736 A1* | 8/2014 | Zhang .................. H04W 12/04 380/270 |

FOREIGN PATENT DOCUMENTS

| | | |
|---|---|---|
| WO | 2013063694 A9 | 5/2013 |
| WO | PCT/US2015/057766 | 2/2016 |

OTHER PUBLICATIONS

Alcatel-Lucent, "Introduction to Evolved Packet Core," Strategic White Paper, Nov. 2009, 12 pages.

Alcatel-Lucent, "Alcatel-Lucent Evolved Packet Core Solution: Delivering Technical Innovation for the New LTE Mobile Core," Technology White Paper, Apr. 2009, 16 pages.

3GPP2, "Interoperability Specification (IOS) for High Rate Packet Data (HRPD) Radio Access Network Interfaces with Session Control in the Access Network," 3GPP2 Specification No. A.S0008-0, Version 4.0, May 2007, 136 pages.

3GPP2, "Generic Key Exchange Protocol for cdma2000 High Rate Packet Data Air Interface," 3GPP2 Specification No. C.S0067, Version 1.0, Nov. 2005, 29 pages.

3GPP2, "Key Exchange Protocols for cdma2000 High Rate Packet Data Air Interface," 3GPP2 Specification No. C.S0067-A, Version 1.0, Feb. 2009, 50 pages.

3GPP2, "E-UTRAN—eHRPD Connectivity and Interworking: Core Network Aspects," 3GPP2 Specification X.S0057-0, Version 0.13.0, 152 pages.

B. Aboba et al., "Extensible Authentication Protocol (EAP)," Network Working Group, RFC 3748, Jun. 2004, 67 pages.

J. Arkko et al., "Extensible Authentication Protocol Method for 3rd Generation Authentication and Key Agreement (EAP-AKA)," Network Working Group, RFC 4187, Jan. 2006, 79 pages.

J. Arkko et al., "Improved Extensible Authentication Protocol Method for 3rd Generation Authentication and Key Agreement (EAP-AKA)," Network Working Group, Internet-Draft, Updates 4187, draft-arkko-eap-aka-kdf-10, Nov. 2008, 23 pages.

3GPP2, "E-UTRAN—eHRPD Connectivity and Interworking: Core Network Aspects," 3GPP2 Specification No. X.S0057-0, Version 1.0, Apr. 2009, 154 pages.

3GPP, Digital Cellular Telecommunications System (Phase 2+); Universal Mobile Telecommunications System (UMTS); LTE; Generic Authentication Architecture (GAA); Generic Bootstrapping Architecture (GBA), 3GPP TS 33.220, Version 12.3.0, Release 12, Jun. 2014, 94 pages.

* cited by examiner

GENERATION OF MULTIPLE SHARED KEYS BY USER EQUIPMENT AND BASE STATION USING KEY EXPANSION MULTIPLIER

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Communication system standards in the wireless cellular context include, for example, Long Term Evolution (LTE) standards promulgated by an organization known as the 3G Partnership Project (3GPP). The LTE standards developed by 3GPP define an LTE system that includes an Internet protocol (IP) based packet core referred to as an Evolved Packet Core (EPC).

In an example LTE system, user equipment such as a mobile device communicates over an air interface with a base station referred to as an evolved Node B (eNB). The eNB is illustratively part of an access network of the LTE system, such as an Evolved Universal Terrestrial Radio Access Network (E-UTRAN).

Under current practice, security for the air interface between the user equipment and the eNB is provided using techniques described in, for example, 3GPP TS 33.401 V12.12.0 (2014-09), Technical Specification Group Services and System Aspects, 3GPP System Architecture Evolution (SAE), Security Architecture (Release 12), which is incorporated by reference herein.

SUMMARY

In one embodiment, multiple keys are generated in user equipment of a communication system based at least in part on a designated key expansion multiplier. A key identifier is received in the user equipment from a base station of the communication system. The user equipment selects a particular one of the keys as a function of the received key identifier, and utilizes the selected one of the keys to secure data sent from the user equipment to the base station.

In another embodiment, multiple keys are generated in a base station of a communication system based at least in part on a designated key expansion multiplier. The base station selects a particular one of the keys, sends an identifier of the selected one of the keys to user equipment, and utilizes the selected one of the keys to secure data sent from the base station to the user equipment.

The multiple keys illustratively comprise multiple shared keys independently generated by both the user equipment and the base station, with selected ones of the shared keys being utilized to secure data sent over an air interface between the user equipment and the base station.

By way of example, the keys in some embodiments illustratively comprise respective portions of a key stream generated by the user equipment responsive to a message received from the base station, with the keys being shared by the user equipment and the base station through independent generation of the key stream in both the user equipment and the base station.

The base station in some embodiments comprises an eNB of an E-UTRAN, although other types of base stations can be used in other embodiments.

In embodiments in which the base station comprises an eNB, the keys may illustratively comprise an indexed sequence of $K_{eNB}$ keys that are shared by the user equipment and the base station through independent generation of the indexed sequence of $K_{eNB}$ keys in the base station, with the total number of $K_{eNB}$ keys in the indexed sequence of $K_{eNB}$ keys being specified by the key expansion multiplier.

In some embodiments, in conjunction with transfer of control of an ongoing communication with the user equipment from the base station to another base station, unused ones of the plurality of keys are transferred to the other base station. The other base station selects a particular one of the transferred keys, and sends an identifier of the selected one of the transferred keys to the user equipment. The selected one of the transferred keys is utilized, for example, to secure data sent over an air interface between the other base station and the user equipment.

A base station in some embodiments is configured to detect a condition in which a remaining number of unused ones of the plurality of keys reaches a specified minimum value, and to repeat the key generation responsive to the detected condition.

Advantageously, one or more of the illustrative embodiments can significantly enhance the efficiency of key generation and selection in communication systems, such as LTE systems, without unduly increasing system cost or complexity.

Furthermore, the disclosed techniques can be adapted in a straightforward manner to numerous other communication system contexts.

These and other features and advantages of embodiments described herein will become more apparent from the accompanying drawings and the following detailed description.

DETAILED DESCRIPTION

Embodiments will be illustrated herein in conjunction with example communication systems and associated techniques for generating multiple shared keys in user equipment and base station elements based on a key expansion multiplier. It should be understood, however, that the scope of the claims is not limited to particular types of communication systems and/or key generation and selection processes disclosed. Embodiments can be implemented in a wide variety of other types of communication systems, using alternative processes and operations. For example, although illustrated in the context of wireless cellular systems utilizing 3GPP system elements such as an LTE EPC, the disclosed embodiments can be adapted in a straightforward manner to a variety of other types of communication systems, including WiMAX systems, Wi-Fi systems, etc.

Figure 1:
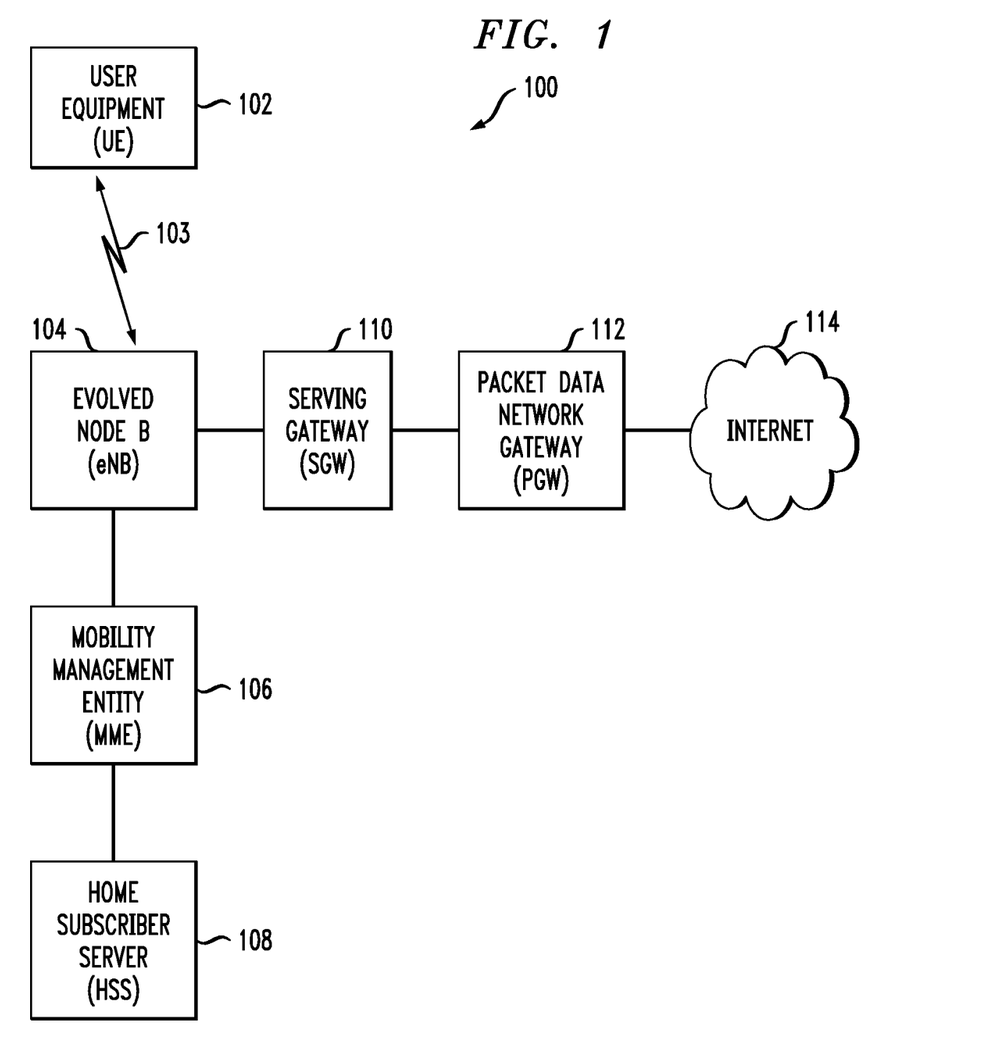
FIG. 1 is a block diagram of a communication system in an illustrative embodiment.

FIG. 1 shows a communication system 100 comprising user equipment (UE) 102 that communicates via an air interface 103 with an evolved Node B (eNB) 104. In this illustrative embodiment, the communication system 100 comprises a wireless cellular system, and more particularly, an LTE system.

The user equipment 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop. Such communication devices are also intended to encompass devices commonly referred to as "access terminals."

The eNB 104 is illustratively part of an access network of the communication system 100. Such an access network may comprise, for example, an E-UTRAN having a plurality of base stations and one or more associated radio network controllers (RNCs). The base stations and RNCs are logically separate entities, but in a given embodiment may be implemented in the same physical network element, such as, for example, a base station router or femto cellular access point.

The eNB 104 in this present embodiment is coupled via a Mobility Management Entity (MME) 106 to a Home Subscriber Server (HSS) 108. The eNB 104 also communicates via Serving Gateway (SGW) 110 and Packet Data Network (PDN) Gateway (PGW) 112 with Internet 114.

It is to be appreciated that this particular arrangement of system elements is an example only, and other types and arrangements of additional or alternative elements can be used to implement an LTE system in other embodiments. For example, in other embodiments, the system 100 may comprise an authentication server, such as a 3GPP Authentication, Authorization and Accounting (AAA) server.

Accordingly, the FIG. 1 arrangement is just one example configuration of a wireless cellular system, and numerous alternative configurations of system elements may be used. For example, although only single user equipment, eNB, MME, HSS, SGW and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

The above-cited 3GPP standard TS 33.401 describes techniques for establishing a security association between UE and eNB elements to protect LTE control and user plane communications sent over the air interface. This security association is defined as a shared key $K_{eNB}$ mutually computed by the UE and MME elements using a result of a successful Authentication and Key Agreement (AKA) process. More particularly, an intermediate shared key $K_{ASME}$ resulting from the successful AKA process is utilized by the UE and MME elements in independently generating the shared key $K_{eNB}$. The shared key $K_{eNB}$ as generated by the MME is delivered by the MME to the eNB and is retained in the eNB until it is refreshed or updated.

It should be noted that recent additions to the 3GPP standards provide a Small Cell Extension capability. This capability allows simultaneous dual connectivity of a UE element to a Macro Cell eNB (MeNB) and a Small Cell eNB (SeNB). The security key for the SeNB is denoted S-$K_{eNB}$ and is generated by the MeNB and provided by the MeNB to the SeNB, while it is also independently computed by the UE. In some operational situations, the S-$K_{eNB}$ is also refreshed or updated.

By way of example, key refresh may be triggered if an amount of data transmitted by the UE through a given base station, which may comprise an eNB, an MeNB or an SeNB, approaches a specified limit of a data packet counter, illustratively denoted as Packet Data Convergence Protocol (PDCP) COUNT.

As another example, key refresh may be triggered upon potential reuse of allocated bearer identities by the base station.

In accordance with techniques described in the above-cited 3GPP standard TS 33.401, a given $K_{eNB}$ is refreshed by executing a self-handoff procedure that leads to computation of a new $K_{eNB}$. This self-handoff procedure generally involves the sending of a substantial number of signaling messages over the air interface in conjunction with stalling of packet flow in both uplink and downlink directions between the UE and eNB.

Additional techniques are disclosed for deriving a new $K_{eNB}$ during handoffs between eNBs, including generation of a new $K_{eNB}$ by the MME from the current $K_{ASME}$ as well as generation of a new $K_{eNB}$ for a target eNB from the current $K_{eNB}$ of the serving eNB by the serving eNB. However, these techniques typically utilize extensive handoff signaling and in some cases can be prone to failure.

For the dual connectivity capability described above, a number of different techniques may be used to refresh the S-$K_{eNB}$. For example, in one such technique, the MME generates a new $K_{eNB}$ from the current $K_{ASME}$ and then the new S-$K_{eNB}$ is generated by the MeNB from the new $K_{eNB}$. In another technique, the MeNB generates the new S-$K_{eNB}$ by incrementing a Secondary Cell Group (SCG) counter and then computing the S-$K_{eNB}$ using the incremented SCG counter as a freshness input. In both of these techniques, the key refresh utilizes a lengthy procedure and algorithmic computations.

Also, small cell deployment scenarios are often handoff intensive, with an ongoing communication being handed off from one small cell to another multiple times within a relatively short period of time, leading to even more instances of the key refresh procedure and its associated computations.

Various embodiments overcome one or more of these drawbacks of conventional practice by using a designated key expansion multiplier in both the UE and eNB to generate respective shared key streams or other shared sets of multiple shared keys. As will be described in more detail below in conjunction with FIGS. 3 through 5, the eNB in some embodiments provides the key expansion multiplier to the UE, and also provides a key index or other identifier of a particular key from the set of multiple shared keys to be utilized in securing data sent over the air interface between the UE and the eNB. This advantageously avoids excessive use of the above-described self-handoff procedure, while also facilitating key refresh in other contexts, such as handing off from a serving eNB to a target eNB, or refreshing an S-$K_{eNB}$ in the case of dual connectivity.

Figure 2:
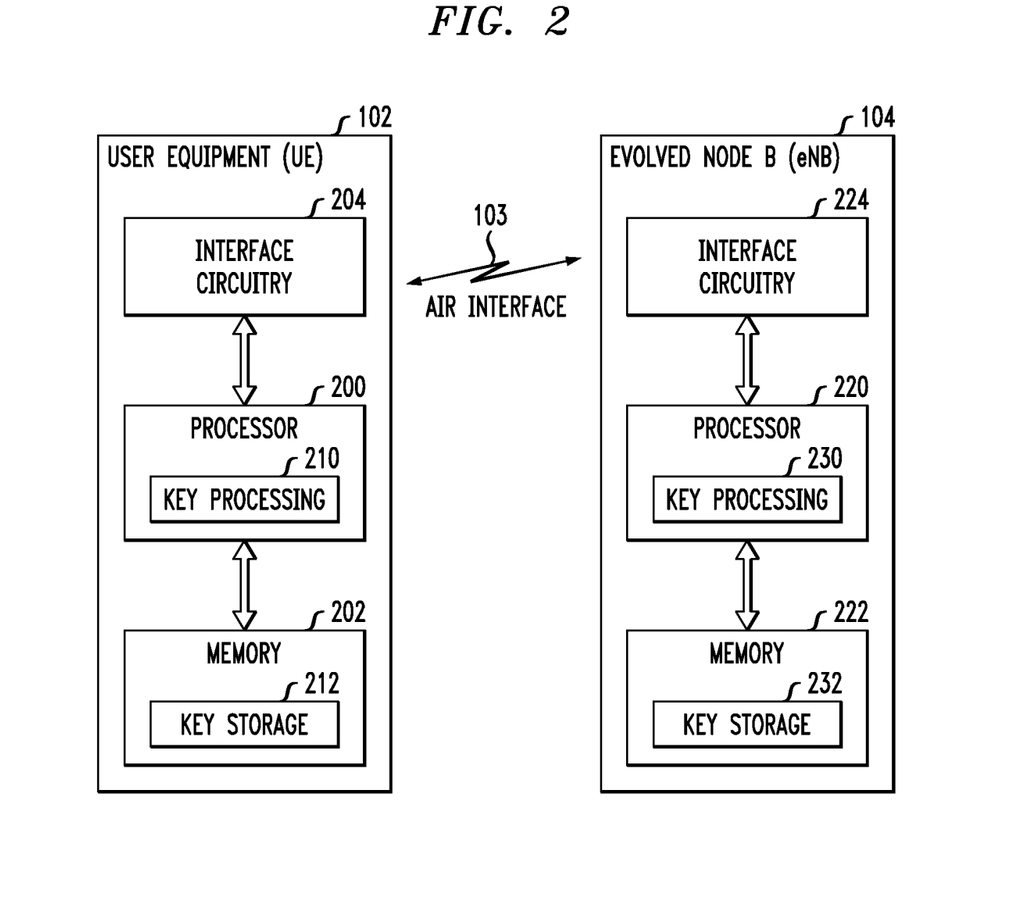
FIG. 2 shows a more detailed view of example user equipment and base station elements in an illustrative embodiment.

FIG. 2 shows a more detailed view of UE 102 and eNB 104 in an illustrative embodiment. The UE 102 comprises a processor 200 coupled to a memory 202 and interface circuitry 204. The processor 200 of the UE 102 includes a key processing module 210 that may be implemented at least in part in the form of software executed by the processor. The key processing module 210 performs the user equipment operations of the processes described in conjunction with FIGS. 3, 4 and 5. The memory 202 of the UE 102 includes a key storage module 212 that stores multiple keys that are generated using a key expansion multiplier and shared with the eNB 104.

The eNB 104 comprises a processor 220 coupled to a memory 222 and interface circuitry 224. The processor 220 of the eNB 104 includes a key processing module 230 that may be implemented at least in part in the form of software executed by the processor. The key processing module 230 performs the eNB operations of the processes described in conjunction with FIGS. 3, 4 and 5. The memory 222 of the eNB 104 includes a key storage module 232 that stores multiple keys that are generated using a key expansion multiplier and shared with the UE 102.

The processors 200 and 220 of the respective UE 102 and eNB 104 may comprise, for example, microprocessors, application-specific integrated circuits (ASICs), digital signal processors (DSPs) or other types of processing devices, as well as portions or combinations of such elements.

The memories 202 and 222 of the respective UE 102 and eNB 104 may be used to store one or more software programs that are executed by the respective processors 200 and 220 to implement at least a portion of the functionality described herein. For example, multiple shared key generation and selection operations and other functionality as described in conjunction with FIGS. 3, 4 and 5 may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective UE 102 and eNB 104 illustratively comprise transceivers or other communication hardware or firmware that allows the associated system elements to communicate with one another in the manner described herein.

It is apparent from FIG. 2 that UE 102 is configured for communication over air interface 103 with eNB 104 and vice-versa via their respective interface circuitries 204 and 224. This communication involves UE 102 sending data to the eNB 104 over the air interface 103 and the eNB 104 sending data to the UE 102 over the air interface 103. Such data sent over the air interface 103 between the UE 102 and the eNB 104 is secured using selected ones of the above-noted multiple shared keys generated using a key expansion multiplier. The term "data" as used herein is intended to be construed broadly, so as to encompass any type of information that may be sent over an air interface between user equipment and base station elements, including, audio, video, multimedia, etc.

It is to be appreciated that the particular arrangement of user equipment and base station components shown in FIG. 2 is an example only, and numerous alternative configurations may be used in other embodiments. For example, the user equipment and base station can be configured to incorporate additional or alternative components and to support other communication protocols.

Other system elements, such as MME 106, HSS 108, SGW 110 and PGW 112, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB and an associated RNC.

Figure 3:
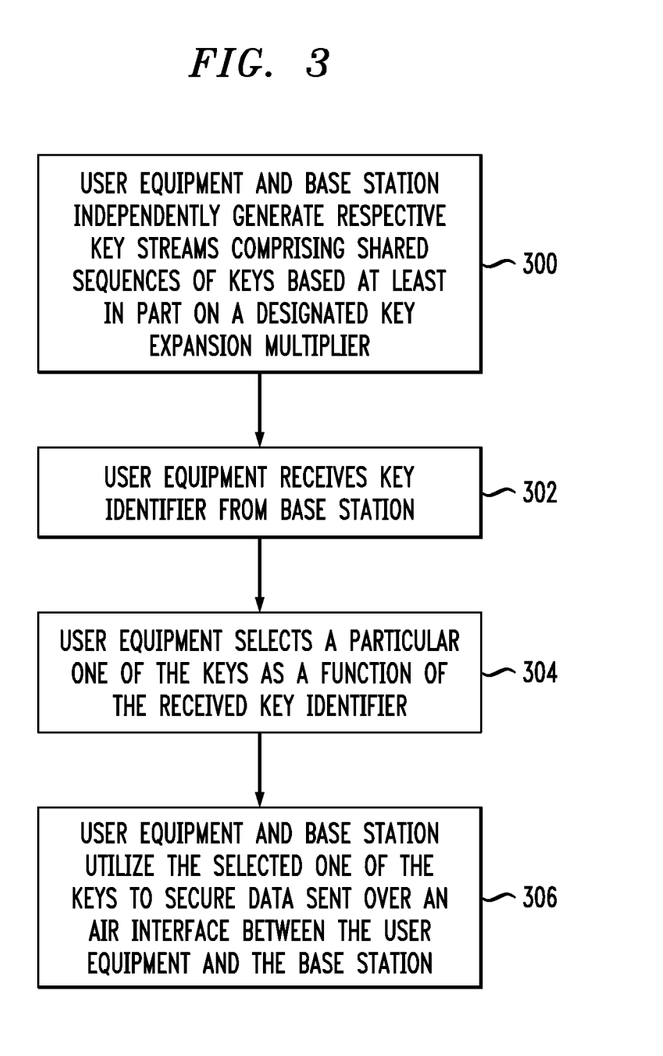
FIG. 3 is a flow diagram of an example key generation and selection process in an illustrative embodiment.

Referring now to FIG. 3, an example key generation and selection process is shown. The process is carried out by user equipment, such as UE 102, and a base station, such as eNB 104, in an illustrative embodiment. The process as illustrated includes steps 300 through 306, with steps 300 and 306 being performed by both the user equipment and the base station, and steps 302 and 304 being performed by the user equipment. For example, these steps may be performed at least in part by the key processing modules 210 and 230 of the respective UE 102 and eNB 104 utilizing key storage modules 212 and 232 of the respective UE 102 and eNB 104. The process can also be implemented using other types of user equipment and base stations in other embodiments.

In step 300, the user equipment and base station independently generate respective key streams comprising shared sequences of keys based at least in part on a designated key expansion multiplier. Such a key stream is an example of what is more generally referred to herein as a "plurality of keys" that are generated based at least in part on a designated key expansion multiplier. The generation of the key stream in the user equipment is illustratively triggered responsive to a message received from the base station. The base station can generate its own key stream before, after or in conjunction with the sending of such a message to the user equipment.

It should be noted that terms such as "generating" and "generated" as used herein in conjunction with independent construction of pluralities of shared keys by user equipment and a base station are intended to be broadly construed to cover arrangements in which at least an initial one of the keys in at least one of the pluralities of keys is generated by another system element and supplied to the user equipment or base station. For example, in some embodiments, as indicated previously, a current $K_{eNB}$ key is generated by an MME and supplied by the MME to the eNB. Generation of a key stream or other plurality of keys in an eNB that includes the supplied current $K_{eNB}$ in such situations is intended to be encompassed by the recitation of generating a plurality of keys in the eNB.

Figure 4:
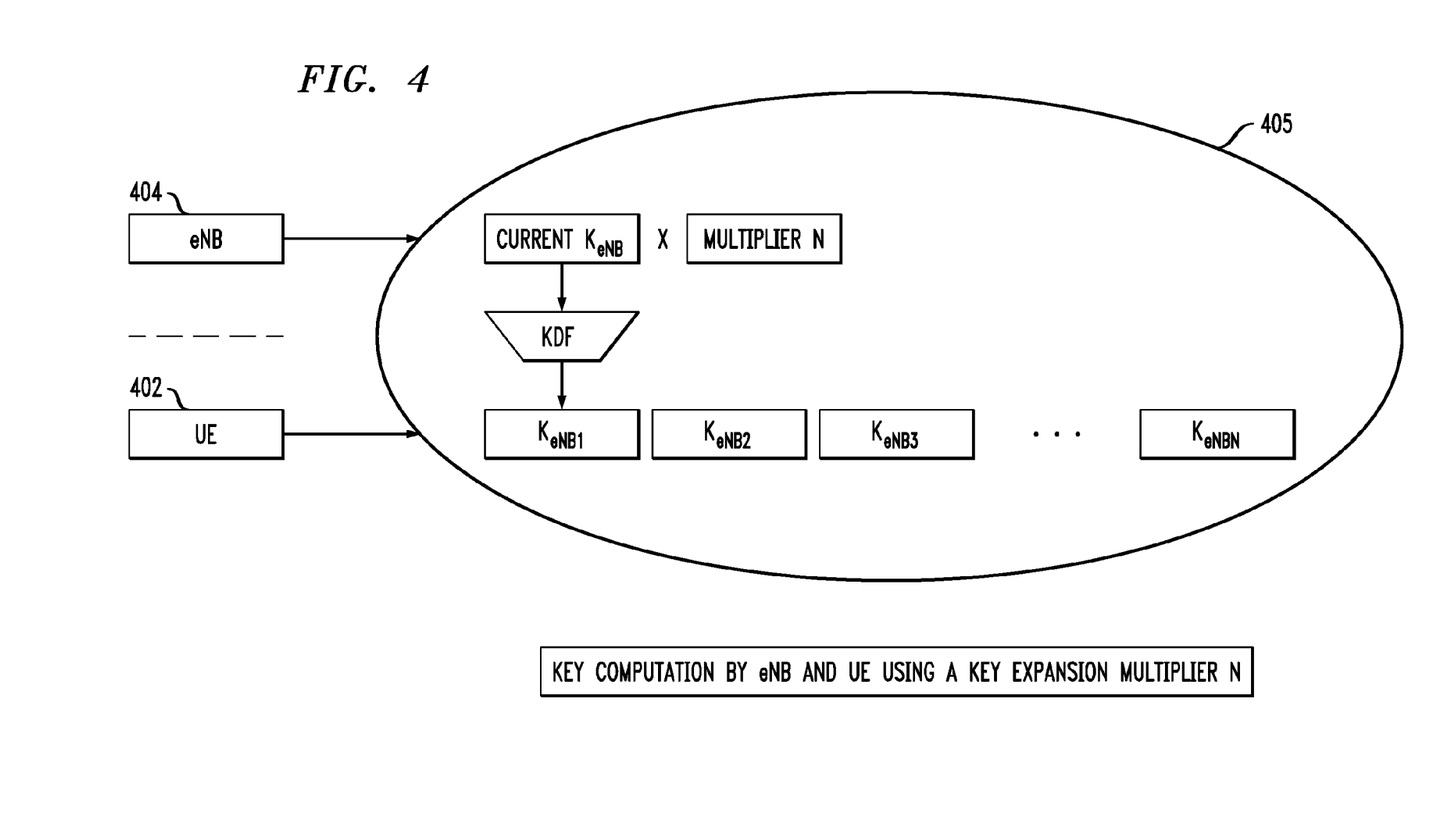
FIG. 4 shows one possible technique for generation of multiple shared keys by user equipment and a base station using a key expansion multiplier in an illustrative embodiment.

One possible technique for generating the key streams in step 300 is illustrated in FIG. 4. In this embodiment, UE 402 and eNB 404, which may be viewed as corresponding generally to UE 102 and eNB 104 as previously described, each independently perform a key computation process 405 using a key expansion multiplier denoted N. The key expansion multiplier may, in various embodiments, be understood to be a value used in a key computation protocol so as to generate a pseudorandom string which is a function of the key expansion multiplier and whose length is equal to the multiplier times a standard key length. The key computation protocol may thereby provide multiple session keys of equal length and equal security.

As will be described in conjunction with FIG. 5, the key expansion multiplier N in some embodiments is supplied to the user equipment by the base station, possibly in a radio resource control (RRC) security mode command, an RRC reconfiguration request or other type of message from the base station.

The user equipment can additionally or alternatively be configured to utilize a default value for the key expansion multiplier. For example, responsive to detection of absence of an explicit value of the key expansion multiplier in a message from the base station otherwise expected to contain the explicit value, the user equipment can set the key expansion multiplier to a predetermined default value.

Such a default value may be a value of one or a NULL value, both of which indicate to the user equipment that no key expansion should be performed, and instead only a single $K_{eNB}$ key should be used. In this case, the default configuration effectively results in omission of the key expansion multiplier as an input to computation of the key stream, leading to generation of only a single key rather than a plurality of keys. The resulting single key in this default case may but need not be the same as that which would be generated without the use of any key expansion multiplier. For example, the default single key may comprise the current $K_{eNB}$ key without any further modification thereof.

It is also possible to utilize default values that are greater than one, such that the user equipment automatically applies a predetermined default key expansion multiplier, thereby generating a key stream comprising a predetermined number of multiple keys, in the absence of an explicit value of the key expansion multiplier in a message from the base station otherwise expected to contain the explicit value.

These and other default key expansion multiplier values are considered designated key expansion multipliers as that term is broadly used herein.

In the FIG. 4 embodiment, the UE 402 and eNB 404 each perform the process 405 to generate respective shared key streams as shown. In each of the UE 402 and the eNB 404, the current $K_{eNB}$ key is multiplied by the designated key expansion multiplier N and the result is processed through a key derivation function (KDF) to yield a key stream comprising an indexed sequence of $K_{eNB}$ keys denoted $K_{eNB1}$, $K_{eNB2}$, $K_{eNB3}$, ... $K_{eNBN}$. The KDF illustratively comprises one or more pseudorandom functions of a type known to those skilled in the art. One example of a KDF suitable for use in the present embodiment is provided in Annex B of 3GPP TS 33.220 V12.3.0 (2014-06), Technical Specification Group Services and System Aspects, Generic Authentication Architecture (GAA), Generic Bootstrapping Architecture (GBA) (Release 12), which is incorporated by reference herein. The resulting indexed sequence of $K_{eNB}$ keys is shared by the UE 402 and eNB 404 through independent generation of the indexed sequence in both the UE 402 and eNB 404.

Each of the keys in the indexed key sequence in the present embodiment is of the same length as the current $K_{eNB}$ key and is configured to provide substantially the same level of security as the current $K_{eNB}$ key. The initial key in the shared key stream in this embodiment is illustratively distinct from the current $K_{eNB}$ key that is shared by the UE 402 and the eNB 404, but in other embodiments may comprise the current $K_{eNB}$ key that is shared by the UE 402 and the eNB 404. The total number of $K_{eNB}$ keys in the indexed sequence of $K_{eNB}$ keys is specified by the key expansion multiplier N.

Thus, in the FIG. 4 embodiment, the keys of the shared key stream comprise N keys indexed by integer values ranging from 1 to N. The key index in this embodiment therefore takes on integer values from 1 to N, with a given integer value in this range identifying a particular one of the keys of the shared key stream. In other embodiments, different types of key identifiers may be used.

Although the key expansion multiplier in the FIG. 4 embodiment is a positive integer denoting the total number of keys in a key stream, other types of key expansion multipliers can be used. For example, a given key expansion multiplier could indicate the number of additional keys to be generated not including the initial shared $K_{eNB}$ key. A multiplier of this type would have a value of N−1 in the context of the FIG. 4 embodiment. Other alternative indications of designated expansions of key material are considered to be encompassed by the general term "key expansion multiplier" as used herein.

Returning to FIG. 3, the user equipment in step 302 receives a key identifier from the base station. This key identifier specifies a particular one of the keys of the shared key stream previously generated in step 302. The key identifier may be received by the user equipment from the base station in the same message that conveys the key expansion multiplier, or in a separate message. As indicated above, such messages can illustratively comprise RRC security mode commands, RRC reconfiguration requests, or other types of messages.

In step 304, the user equipment selects a particular one of the keys as a function of the received key identifier. More specifically, the user equipment in this embodiment selects the particular key identified by the key identifier, such as the particular one of the keys identified by the key index in FIG. 4.

In step 306, the user equipment and the base station utilize the selected one of the keys to secure data sent over an air interface between the user equipment and the base station. More particularly, the same selected key is utilized by the user equipment to secure data sent to the base station, and by the base station to secure data sent to the user equipment.

Accordingly, in the FIG. 3 embodiment, the base station is configured to indicate to the user equipment the particular one of the multiple shared keys of the key stream to utilize in securing data sent over the air interface for a particular period or other interval of communication.

After the user equipment has generated a shared key stream in the manner described in conjunction with step 300 above, steps 302, 304 and 306 can be repeated one or more times for different keys of the key stream. For example, these steps may be repeated N times until the N different keys of the key stream are exhausted. This advantageously allows the base station and user equipment to establish multiple new $K_{eNB}$ keys for securing their air interface communications over time without requiring repeated execution of the self-handoff procedure noted above.

By way of example, responsive to a trigger condition, such as a key refresh or key update condition, the user equipment receives another key identifier from the base station, selects another one of the keys of the key stream as a function of the received other key identifier, and utilizes the selected other one of the keys to secure data sent from the user equipment to the base station. Other types of trigger conditions, such as base station handoff conditions, can additionally or alternatively be used.

It should be noted that terms such as "key refresh" and "key update" as used herein are intended to be broadly construed, and should not be viewed as being limited to particular types of operations associated with certain 3GPP standards such as the above-referenced 3GPP standard TS 33.401.

The independent key stream generation of step 300 can also be repeated periodically or as needed. Such repetition of step 300 can also be performed responsive to one or more designated trigger conditions, such as reaching a final or near-final key of the current key stream.

The particular process steps described above in conjunction with the flow diagram of FIG. 3 are examples only, and additional or alternative process steps may be used in other embodiments. For example, the ordering of the process steps as shown in the figure can be varied, and certain steps shown serially in the figure can in some cases be performed at least in part in parallel with one another.

Another illustrative embodiment of a key generation and selection process carried out by user equipment and a base station will now be described with reference to FIG. 5. This figure illustrates interactions between UE 502, eNB 504 and MME 506 in generating key streams shared by the UE 502 and the eNB 504. The UE 502, eNB 504 and MME 506 may be viewed as corresponding generally to the UE 102, eNB 104 and MME 106 of the FIG. 1 embodiment.

Figure 5:
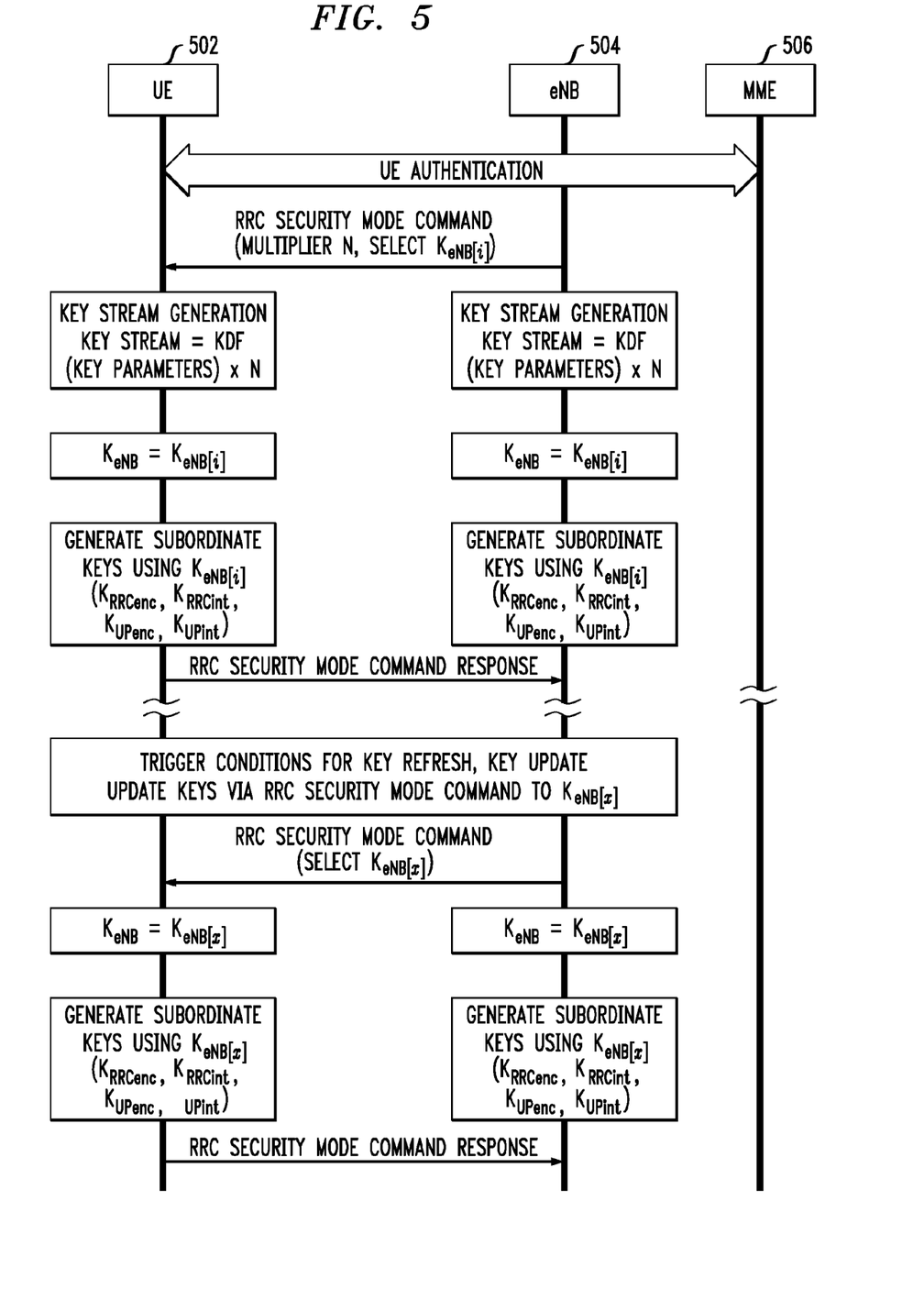
FIG. 5 shows a key generation and selection process carried out by user equipment and a base station in an illustrative embodiment.

In the FIG. 5 process, the UE 502 initially carries out an authentication process with the MME 506. This authentication process illustratively comprises the AKA process mentioned elsewhere herein. Upon successful completion of the authentication process, both the UE 502 and MME 506 have independently generated a current $K_{eNB}$ key. The $K_{eNB}$ key is subsequently delivered by the MME 506 to the eNB 504, although delivery of the $K_{eNB}$ key is not explicitly shown in the figure.

The eNB 504 sends an RRC security mode command to the UE 502 that includes the key expansion multiplier N and an index i directing the UE 502 to select an i-th key of a shared key stream. Such a command is an example of what is more generally referred to herein as a "message" sent from a base station to user equipment. In this embodiment, both the key expansion multiplier N and the index i are sent in the same message, but in other embodiments a wide variety of other types and arrangements of messages may be used to convey such information.

The sending of the RRC security mode command containing the key expansion multiplier N and initial key identifier i is illustratively triggered by receipt of the $K_{eNB}$ key in the eNB 504 from the MME 506. It should be noted that in other embodiments, the sending of such a command can be triggered by receipt of a $K_{eNB}$ key in the eNB 504 from another eNB of the system, or under other conditions.

In response to the RRC security mode command, the UE 502 generates a key stream by applying the KDF to one or more key parameters that include at least the current $K_{eNB}$ key expanded by the key expansion multiplier N. Other types of key parameters may be utilized in generating a key stream in other embodiments. Also, the application of the KDF may be varied in other embodiments. For example, the one or more key parameters may be multiplied by the key expansion multiplier N with the result being subject to the KDF, or may be subject to the KDF with the result being multiplied by the key expansion multiplier N.

After generating the key stream, the UE 502 sets its current $K_{eNB}$ key to the selected key $K_{eNB[i]}$ indicated by the eNB 504 in the RRC security mode command. The initially selected key $K_{eNB[i]}$ illustratively comprises an initial key of the key stream, although non-initial keys may alternatively be selected.

The eNB 504 independently generates the key stream and sets its current $K_{eNB}$ key to the selected key $K_{eNB[i]}$ of the key stream.

Both the UE 502 and the eNB 504 generate various subordinate keys from $K_{eNB[i]}$, including keys denoted $K_{RRCenc}$, $K_{RRCint}$, $K_{UPenc}$ and $K_{UPint}$, all described in greater detail in the above-referenced 3GPP standard TS 33.401. Additional or alternative subordinate keys can be generated from the selected key $K_{eNB[i]}$ of the key stream in other embodiments.

It should be noted that references herein to securing data sent, for example, over an air interface between user equipment and a base station utilizing a selected key, are intended to encompass arrangements in which one or more keys derived from a selected key are utilized to secure such communications. Also, various combinations of a selected key and one or more subordinate keys may be used to secure a given communication.

After the UE 502 has completed its key stream generation, key selection and subordinate key generation operations, it sends an RRC security mode command response to the eNB 504 as indicated in the figure.

Responsive to one or more trigger conditions for key refresh or key update, the $K_{eNB}$ key is refreshed or updated in the following manner.

The eNB 504 sends an identifier of another one of the keys of the key stream to the UE 502 in another RRC security mode command. This other key of the key stream is denoted $K_{eNB[x]}$, where $x \leq N$. The UE 502 sets its current $K_{eNB}$ key to the selected key $K_{eNB[x]}$ indicated by the eNB 504 in the RRC security mode command. The eNB 504 also sets its current $K_{eNB}$ key to the selected key $K_{eNB[x]}$. Both the UE 502 and the eNB 504 again generate various subordinate keys from the new selected key $K_{eNB[x]}$, including new versions of the keys denoted $K_{RRCenc}$, $K_{RRCint}$, $K_{UPenc}$ and $K_{UPint}$.

One or more of the RRC security mode commands used in the FIG. 5 embodiment to communicate key expansion multipliers or key identifiers from the base station to the user equipment can instead be implemented in other embodiments using RRC reconfiguration requests, or other types of messages.

The portions of the FIG. 5 process relating to key selection and subordinate key generation can be repeated one or more additional times, until the keys of the initial key stream are exhausted or nearly exhausted. At that point a new key stream may be independently generated by the UE 502 and the eNB 504 by repeating the key stream generation portions of the FIG. 5 process. The keys of the resulting new key stream are then iteratively selected for use in securing data sent over the air interface, under the control of the eNB 504 as previously described. For each key refresh operation performed using a given key stream, the eNB 504 identifies a particular key to the UE 502, and that key is used by both the UE 502 and the eNB 504 in securing data sent over the air interface between those two system elements.

The eNB 504 can be configured to detect conditions under which a new key stream should be generated. For example, the eNB 504 can be configured to detect a condition in which a remaining number of unused ones of the keys of the key stream reaches a specified minimum value, such as zero or one, with the key stream generation portions of the process being repeated responsive to the detected condition.

The key identifiers in the FIG. 5 embodiment are in the form of respective key index values such as i or x. The format of the key identifiers can vary to suit the needs of a particular embodiment. As an example, a multi-bit identifier comprising a total of n=log$_2$N bits can be used to uniquely identify each of the N different keys of the key stream. Other types of key identifiers can be used in other embodiments. For example, a base station can identify a particular key of a key stream to user equipment by directing the user equipment to increment a current key counter. In such an arrangement, a key counter is illustratively configured to count integer values from 1 to N for a given key stream comprising N keys as generated using a key expansion multiplier N.

It is also possible to implement other techniques for communicating the key expansion multiplier from a base station to user equipment. For example, the base station and user equipment could each be configured to support a predetermined number of possible key expansion multipliers, with the base station sending an identifier of a particular one of the key expansion multipliers to the user equipment, rather than sending the particular key expansion multiplier itself.

As noted above, one or more default values may be used for the key expansion multiplier under certain conditions. For example, in the context of the FIG. 5 embodiment, if the initial RRC security mode command is received in UE 502 from eNB 504 without the expected key expansion multiplier, the UE 502 can automatically use a default value for the key expansion multiplier. For example, such a default value can be a value greater than one, indicating to the UE 502 that a designated default amount of key expansion is to be applied. As another example, the default value can be a value of one or a NULL value. In the case of a one value or a NULL value, the absence of an expected key expansion multiplier in the initial RRC security mode command can indicate to the UE 502 that no key expansion is to be performed, such that the UE 502 and eNB 504 revert to use of a single key rather than a key selected from a key stream.

Although not illustrated in FIG. 5, unused portions of a given key stream can be sent from one base station to another base station. For example, in conjunction with the transfer of an ongoing communication with the UE 502 from serving eNB 504 to another eNB of the system, referred to as a target eNB, any remaining unused keys of the key stream can be transferred from the serving eNB to the target eNB. The target eNB can then select a particular one of the transferred keys, send an identifier of the selected one of the transferred keys to UE 502, and utilize the selected one of the transferred keys to secure data sent to the UE 502 in the ongoing communication.

The illustrative embodiments provide techniques for key generation and selection in LTE systems and other communication systems. These embodiments can substantially improve system security and performance, without unduly increasing system cost or complexity. For example, these embodiments can avoid the signaling overhead and delays associated with performance of a separate instance of a self-handoff procedure for each $K_{eNB}$ key refresh operation.

In addition, simplified and streamlined key refresh is provided for handling data sessions managed by small cells in the above-described dual connectivity configurations. Accordingly, the computational burden of key refresh is considerably reduced in these handoff intensive small cell deployment scenarios. The vulnerability of data sent through small cells in otherwise unsecure locations is also reduced.

Furthermore, one or more of the illustrative embodiments can be implemented with only minimal changes to the existing 3GPP standards such as the above-cited TS 33.401 standard.

As indicated previously, the embodiments are not limited to the LTE context and the disclosed techniques can be adapted in a straightforward manner to a wide variety of other communication system contexts.

The processor, memory, controller and other components of a user equipment or base station element of a communication system as disclosed herein may include well-known circuitry suitably modified to implement at least a portion of the key generation and selection functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein.

Also, embodiments may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, shared key generation and selection processes, messaging protocols and message formats than those described above in the context of the illustrative embodiments. These and numerous other alternative embodiments within the scope of the appended claims will be readily apparent to those skilled in the art.

What is claimed is:

1. A method comprising:
generating in user equipment of a communication system a first instance of a key stream comprising a plurality of keys with the length of the key stream being determined based at least in part on a designated key expansion multiplier that is also utilized in a base station of the communication system to generate a second instance of the key stream comprising the plurality of keys;
receiving a key identifier in the user equipment from the base station of the communication system, the key identifier comprising a key index into the first and second key stream instances generated by the user equipment and the base station, respectively;
selecting in the user equipment a particular one of the keys as a function of the received key identifier; and
utilizing the selected one of the keys to secure data sent from the user equipment to the base station.

2. The method of claim 1 wherein the first instance of the key stream is generated by the user equipment responsive to a message received from the base station.

3. The method of claim 2 wherein the keys are shared by the user equipment and the base station through independent generation of the first and second instances of the key stream in the user equipment and the base station, respectively.

4. The method of claim 1 wherein the base station comprises an evolved Node B (eNB) of an evolved Universal Terrestrial Radio Access Network (E-UTRAN).

5. The method of claim 1 wherein the keys comprise an indexed sequence of $K_{eNB}$ keys that are shared by the user equipment and the base station through independent generation of the indexed sequence of $K_{eNB}$ keys in the base station.

6. The method of claim 5 wherein a total number of $K_{eNB}$ keys in the indexed sequence of $K_{eNB}$ keys is specified by the key expansion multiplier.

7. The method of claim 1 wherein receiving the key identifier comprises receiving both the key identifier and the key expansion multiplier in at least one message from the base station.

8. The method of claim 1 further comprising setting the key expansion multiplier to a predetermined default value in response to determining the absence of an explicit value of the key expansion multiplier in a message from the base station otherwise expected to contain said explicit value.

9. The method of claim 1 wherein receiving the key identifier comprises receiving the key identifier in a radio resource control (RRC) security mode command from the base station.

10. The method of claim 1 further comprising receiving the key expansion multiplier in an RRC security mode command from the base station.

11. The method of claim 1 wherein both the key expansion multiplier and the key identifier are received in a single RRC security mode command from the base station.

12. The method of claim 1 wherein the multiplier and the key identifier are received in different RRC security mode commands from the base station.

13. The method of claim 1 further comprising receiving at least one of the key expansion multiplier and the key identifier in an RRC reconfiguration request from the base station.

14. The method of claim 1 further comprising repeating the receiving, selecting and utilizing for each of one or more other ones of the plurality of keys.

15. The method of claim 1 further comprising:
receiving another key identifier in the user equipment from the base station in response to a trigger condition;
selecting in the user equipment another one of the plurality of keys as a function of the received other key identifier; and
utilizing the selected other one of the plurality of keys to secure data sent from the user equipment to the base station.

16. The method of claim 15 wherein the trigger condition comprises at least one of a key refresh condition, a key update condition and a base station handoff condition.

17. An article of manufacture comprising a non-transitory computer-readable storage medium having embodied therein executable program code that when executed by a processor of the user equipment causes the user equipment to perform the method of claim 1.

18. An apparatus comprising:
user equipment configured for communication with a base station of a communication system;
the user equipment being further configured:
to generate a first instance of a key stream comprising a plurality of keys with the length of the key stream being determined based at least in part on a designated key expansion multiplier that is also utilized in the base station of the communication system to generate a second instance of the key stream comprising the plurality of keys;
to receive a key identifier from the base station, the key identifier comprising a key index into the first and second key stream instances generated by the user equipment and the base station, respectively;
to select a particular one of the keys as a function of the received key identifier; and
to utilize the selected one of the keys to secure data sent from the user equipment to the base station.

19. The apparatus of claim 18 wherein the user equipment comprises:
a processor;
a memory coupled to said processor; and
a network interface adapted for communication with the base station.

20. A method comprising:
generating in a base station of a communication system a first instance of a key stream comprising a plurality of keys with the length of the key stream being determined based at least in part on a designated key expansion multiplier that is also utilized in user equipment of the communication system to generate a second instance of the key stream comprising the plurality of keys;
selecting in the base station a particular one of the keys;
sending an identifier of the selected one of the keys to user equipment from the base station, the identifier comprising a key index into the first and second key stream instances generated by the base station and the user equipment, respectively; and
utilizing the selected one of the keys to secure data sent from the base station to the user equipment.

21. A method comprising:
generating in a base station of a communication system a plurality of keys based at least in part on a designated key expansion multiplier;
selecting in the base station a particular one of the keys;
sending an identifier of the selected one of the keys to user equipment from the base station;
utilizing the selected one of the keys to secure data sent from the base station to the user equipment;
in conjunction with transfer of control of an ongoing communication with the user equipment from the base station to another base station, transferring unused ones of the plurality of keys to the other base station;
selecting in the other base station a particular one of the transferred keys;
sending an identifier of the selected one of the transferred keys to the user equipment from the other base station; and
utilizing the selected one of the transferred keys to secure data sent from the other base station to the user equipment.

22. The method of claim 20 further comprising:
detecting in the base station a condition in which a remaining number of unused ones of the plurality of keys reaches a specified minimum value; and
repeating the generating responsive to the detected condition.

23. An article of manufacture comprising a non-transitory computer-readable storage medium having embodied therein executable program code that when executed by a processor of the base station causes the base station to perform the method of claim 20.

24. An apparatus comprising:
a base station configured for communication with user equipment of a communication system;
the base station being further configured:
to generate a first instance of a key stream comprising a plurality of keys with the length of the key stream being determined based at least in part on a designated key expansion multiplier that is also utilized in the user equipment of the communication system to generate a second instance of the key stream comprising the plurality of keys;
to select a particular one of the keys;
to send an identifier of the selected one of the keys to the user equipment, the identifier comprising a key index into the first and second key stream instances generated by the base station and the user equipment, respectively; and
to utilize the selected one of the keys to secure data sent from the base station to the user equipment.

25. The apparatus of claim 24 wherein the base station comprises:
a processor;
a memory coupled to said processor; and
a network interface adapted for communication with the user equipment.

26. The apparatus of claim 18 wherein the user equipment is configured to set the key expansion multiplier to a predetermined default value in response to determining the absence of an explicit value of the key expansion multiplier in a message from the base station otherwise expected to contain said explicit value.

\* \* \* \* \*